(12) United States Patent
Khashei Varnamkhasti et al.

(10) Patent No.: US 10,541,983 B1
(45) Date of Patent: Jan. 21, 2020

(54) SECURE STORAGE AND SEARCHING OF INFORMATION MAINTAINED ON SEARCH SYSTEMS

(71) Applicant: Amazon Technologies, Inc., Seattle, WA (US)

(72) Inventors: Afshin Khashei Varnamkhasti, West Vancouver (CA); Bogdan Ciprian Pistol, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 15/654,468

(22) Filed: Jul. 19, 2017

(51) Int. Cl.
*H04L 29/06* (2006.01)
*G06F 21/60* (2013.01)
*G06F 16/00* (2019.01)
*G06F 16/951* (2019.01)

(52) U.S. Cl.
CPC .......... *H04L 63/0428* (2013.01); *G06F 16/00* (2019.01); *G06F 16/951* (2019.01); *G06F 21/606* (2013.01); *H04L 63/08* (2013.01); *H04L 63/0823* (2013.01)

(58) Field of Classification Search
CPC .... G06F 21/6227; G06F 21/606; G06F 21/60; G06F 2221/2107; G06F 16/316; G06F 16/332; G06F 16/3331; G06F 16/951; G06F 16/00; G06F 2221/07; H04L 9/0643; H04L 63/0823; H04L 63/08; H04L 63/0428
See application file for complete search history.

(56) References Cited

U.S. PATENT DOCUMENTS

| | | | | |
|---|---|---|---|---|
| 10,230,703 | B1* | 3/2019 | Lepore | G06F 12/1408 |
| 2007/0112768 | A1* | 5/2007 | Majumder | G06F 16/951 |
| 2009/0022321 | A1* | 1/2009 | Saito | G06F 21/6272 |
| | | | | 380/278 |
| 2013/0091357 | A1* | 4/2013 | Moon | G06F 21/6227 |
| | | | | 713/168 |

* cited by examiner

*Primary Examiner* — Brian F Shaw
(74) *Attorney, Agent, or Firm* — Knobbe Martens Olson & Bear LLP

(57) ABSTRACT

Systems and techniques are disclosed for secure storage and searching of information on insecure search systems. One of the methods is implemented by a system of one or more computers being in communication with clients and search engines. A request associated with storage of client information in a search engine is obtained. First cryptographic information is generated based on a portion of the client information, such that the first cryptographic is to be utilized for indexing by the search engine. Second cryptographic information is generated based on performing an order-preserving encryption process on portion of the client information, such that the second cryptographic information is to be utilized to recover order associated with information included in the portion. The first cryptographic information and the second cryptographic information are provided for storage in the search system.

20 Claims, 10 Drawing Sheets

SECURE STORAGE AND SEARCHING OF INFORMATION MAINTAINED ON SEARCH SYSTEMS

BACKGROUND

Search systems can utilize a distributed system based architecture, in which multiple nodes (e.g., server systems) can index, and store, large quantities of information. For example, each node can store one or more shards of the information. These search systems can receive search requests from clients, and utilizing the distributed system based architecture, can quickly respond. The information can be indexed according to features of the information, which for example can be fields of defined types that include values related to the fields. An example field can be Age, and example values of the field can be ages of persons (e.g., 22, 25, 67). Information can optionally be separated into respective documents, with each document including one or more fields and one or more associated values.

To maintain search functionality, the information can be stored as plaintext (e.g., unencrypted). In the event of a security breach by an attacker, the attacker can therefore have direct access to the information. These search systems, though being quite fast and efficient at searching, may be inapplicable for access to sensitive or confidential information. For example, user information such as social security numbers, addresses, and so on, may benefit from being searchable, but the above-described search systems may not provide adequate assurances with respect to controlled access of the user information.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
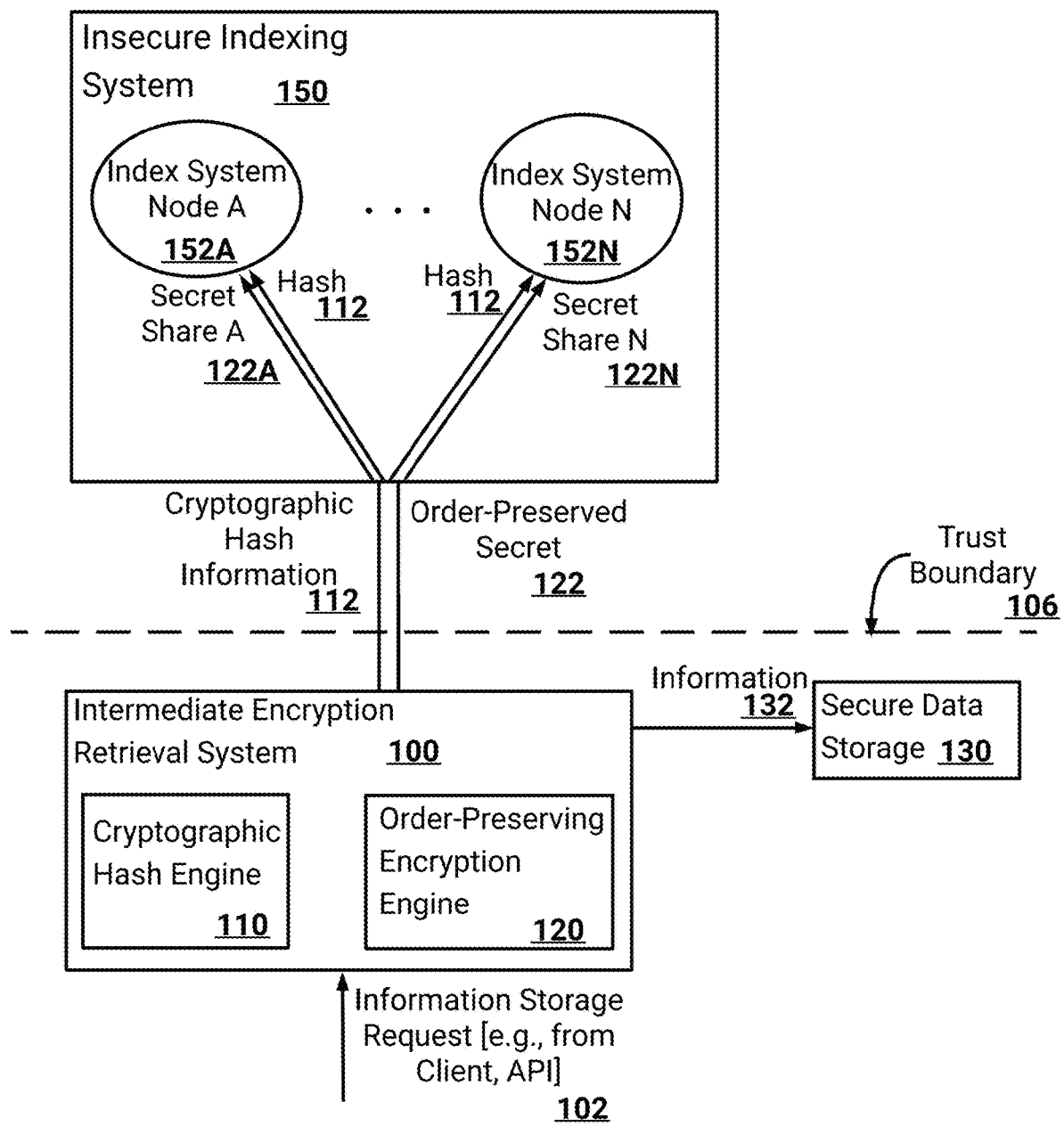
FIG. 1A is a block diagram of an example intermediate encryption retrieval system storing received information.

Although particular embodiments are described herein, other embodiments, including embodiments that do not provide all of the benefits and features set forth herein, will be apparent to those of ordinary skill in the art.

This specification describes a system (e.g., the intermediate encryption retrieval system 100), which in combination with an insecure search system, can enable secure storage and efficient searching of maintained information. As an example, an insecure search system can include a search engine that indexes information in plaintext for rapid response to search requests. For example, the insecure search system can be an ElasticSearch system, and can include multiple search nodes (e.g., server systems) which are able to respond to search requests.

As will be described, the system can receive items of information to be stored (e.g., from clients), and cause the information to be unreadable (e.g., encrypted, cryptographically transformed) to a search system that indexes and/or stores the information. In this way, an attacker who compromises the search system will be unable to utilize the stored information. In this specification, an item of information can include any structured data (e.g., documents, tables) or unstructured data (e.g., text, values, and so on). As an example of structured data, the system can receive information that includes particular fields along with one or more values associated with the particular fields. For example, a particular field can indicate a 'Name' of a user, while a different field can indicate an 'Age' of the user. This information may be organized as a database table (e.g., respective columns of the table can be associated with fields, with rows indicating values), or optionally other formats (e.g., JavaScript Object Notation (JSON), YAML, XML, and so on).

To increase security, the techniques described herein cause the system to modify the received information prior to providing the information for indexing and/or storage by a search system. As will be described, and with respect to structured data, the system can perform a cryptographic process on the values associated with fields. For example, the system can perform a cryptographic hash process on the values (e.g., MD5, SHA-1, and so on). This cryptographic hash process may be utilized in conjunction with a cryptographic key (e.g., from an authorized key server in communication with the system) to obtain keyed-hash message authentication codes (HMACs) of the values. The HMAC values can then be provided to the search system for indexing. While HMAC values are described herein, it should be understood that other cryptographic processes can be utilized instead (e.g., OMAC, CBC-MAC, PMAC, UMAC, VMAC, and so on). Optionally, different cryptographic processes may be performed (e.g., different from cryptographic hash processes), such as encryption processes (e.g., two-way functions), or optionally other one-way functions. Additionally, the received information can be encrypted according to one or more cryptographic keys, and then stored by the search system. In this way, the search system can have limited insight into the specifics of the received information, while retaining fast and efficient search capabilities as will be described.

Search Criteria

As will be described below with respect to at least FIGS. 2A-2C, the system can receive search requests (e.g., from clients), and provide search results in response. A search request can include one or more search criteria (e.g., terms, values, and so on, to be matched) and optionally sort criteria (e.g., described below, with respect to FIGS. 2A-2C). In this specification, sort criteria includes any information indicative of a resulting ordering of search results, and/or indicative of a resulting grouping of search results. For example, a search request can indicate particular search criteria, and specify that the search results are to be ordered according to an 'Age' of each person identified in search results (e.g., the field 'Age' can be specified as the sort criteria).

Since the search system indexes information according to, for example, cryptographic hash values (e.g., HMAC) provided by the system, the system can perform a same cryptographic process on the search criteria. That is, if a client requests a search be performed for a name "John," the system can obtain an HMAC value associated with "John." This HMAC value can be provided to the search system, and the search system can locate information (e.g., documents, records, structured information, unstructured information) that includes the HMAC value. However, particular documents or records may include inaccurate information, such as misspelled names (e.g., Brian in contrast to Bryan, and so on). While a search system that operates on plaintext information may still be able to locate corresponding search results regardless of misspellings, the HMAC values of, for example, Brian and Bryan may be substantially distinct. Therefore, optionally the system can obtain HMAC values of input search criteria along with variations of the input search criteria. For example, the system can compute variations that are within a threshold distance (e.g., Levenshtein distance) from the search criteria. Search results can then be obtained for these variations and presented to a client. Additionally, the system can optionally filter the search criteria, for example removing white spaces, punctuation, capitalization, and so on. Similarly, the system can optionally filter received information prior to indexing by the search system, such that the filtered search criteria can be matched based on the filtered indexing. While the information can be indexed subsequent to the optional filtering, the received information can be stored in an un-filtered form (e.g., in a data storage system, for example secure data storage system 130 described below). In this way, the stored information can be provided un-modified in response to search requests.

In this way the system enables search systems to safely store sensitive information, while preserving their strengths with respect to rapid access and location of search results. As will be described below, the system can receive search request indicating search criteria and sort criteria. The system, in combination with the search system, can receive information identifying search results based on the search criteria and sort criteria. The system can then obtain the search results from the data storage system, and provide the search results in response to the request.

Sort Criteria

In general, and as described above, search systems can be utilized to provide search results based on a search request indicating search criteria and sort criteria. Since the number of search results can potentially be quite high, optionally search systems may provide a portion of the search results to a requesting client. In this way, the search systems can limit an extent to which bandwidth is required, and the client can request additional search results if needed. As an example, a user may be operating a client device (e.g., a laptop, computer, tablet, wearable device), and using a user interface presented on the client device, can provide search requests to the system. The client device can then present a particular portion of the resulting search results, for example the user interface can include 10, 20, 30, search results. The user can interact with the user interface to further request a subsequent portion of the search results. In this way, the search results can be paginated and the user can view differing pages. With both search and sort criteria, the search system may be able to determine an ordering of the resulting search results. For example, if the user searches for a particular name and address of persons ordered by ascending age, the resulting ordering may provide matching persons in order of ascending age. Thus, the client device can present a threshold number of these ordered search results (e.g., a top portion of the search results).

As described above, the system can obtain HMACs of values, and then provide the HMACs to a search system for indexing. For values that can be ordered, for example alphanumerically, the HMACs of the values have no guarantee of being in a same order. For example, the values 2, 8, 3, can be sorted to be 2, 3, and 8. The HMACs of these values are likely to be in a substantially random order. Therefore, if the system were to receive a search request indicating search and sort criteria, the search system may be unable to obtain search results in an ordering that comports with the sort criteria. For example, the search system can identify search results, however as the search system does not have access to the plaintext values, the search system will be unable to sort the search results.

A few example methods of enabling sort criteria to be applied to search results are described. As a first example, the search system can obtain search results that match with indicated search criteria. As described above, a data storage system can store information received with storage requests from clients, for example in an encrypted form (e.g., encrypted at rest). Each item of information, such as a record or document, can be stored in association with a unique identifier. Similarly, the search system can index each item of information in association with a same unique identifier. As will be described, the search system can provide unique identifiers associated with search results to the system, and the system can provide the unique identifiers to the data storage system to obtain the stored information. Therefore, the search system can obtain search results, and provide, at least, the associated unique identifiers to the system. The system can obtain the stored information from the data storage system, and can then obtain plaintext information (e.g., the system can receive encrypted information from the data storage system and decrypt it, or the data storage system can be authorized to decrypt the information upon request to the system). Using the plaintext information, the system can sort the search results according to the sort criteria.

This first example method may be less efficient than other example methods however. For example, the search system has to provide unique identifiers associated with all search results to the system. As will be described, the search system and system may be in communication via a publicly accessible network (e.g., the internet), and providing this much information may cause increased latency and bandwidth. Similarly, the system is then required to obtain stored information associated with the search results from the data storage system. After, the system sorts the search results according to the sort criteria, and upon sorting, provides a threshold number of the search results based on a resulting ordering. This processing can limit an extent to which the system can service search requests from clients, and may increase complexity, processing power, and so on, of the system.

A second example method, which will be described in more detail below with respect to FIGS. 2A-2C, can improve efficiency associated with obtaining sorted search results. In the second example method, upon receipt of storage requests the system can obtain associated HMAC values (e.g., as described above), and also perform an order-preserving encryption process on the plaintext information. For example, the storage request can include structured data in which a field 'Age' includes values 2, 6, 3. The system can then obtain HMAC values associated with the values 2, 6, and 3. These HMAC values can be provided to the search system for indexing. In addition, the system can perform an order-preserving encryption process on each of the values 2, 6, 3, such that an encrypted form of each value (e.g., ciphertext) can be obtained, with the encrypted form being sortable. For example, the order-preserving encryption process can enable the values to be homomorphically encrypted, with the homomorphism being related to preservation of order. As an example, an order relation can have the properties of reflexivity, antisymmetry, and transitivity, with an example order relation including a 'less-than' binary relation. In this way, the encrypted form of value 2 will be less than the encrypted form of value 3, which will be less than the encrypted form of value 6.

As will be described in more detail, the order-preserved encrypted form of each value (e.g., the resulting ciphertext) can also be maintained by the search system. For example, the search system can maintain HMACs of input values (e.g., 2, 6, 3, in the example above) along with a unique identifier of an item of information (e.g., a document, record) in which the input values are included. In addition, the search system can maintain order-preserved encrypted forms of each input value along a same unique identifier of an item of information that includes the input value.

In this way, the search system can obtain search results that match search criteria, and then based on the order-preserved encrypted forms of the search results, can apply the sort criteria. For example, a search request can indicate a name and city of residence of persons along with sort criteria indicating that the search results are to be ordered according to age of the person. The search system can identify search results associated with persons with the same name and city of residence, and which can include HMACs of each identified person's name, city of residence, and age. Similarly, the search system can obtain order-preserved encrypted forms of the search results. Based on the order-preserved encrypted forms, the system can sort the search results according to age. The system can receive, at least, unique identifiers associated with the sorted search results and obtain stored information from the data storage system based on the unique identifiers.

This second example method eases the processing requirements associated with the system, and offloads processing to the search system. Additionally, the bandwidth requirements between the system and the search system are reduced, as the search system can provide a threshold number of the sorted search results (e.g., top search results). Similarly, the bandwidth requirements between the system and the data storage system are reduced, as the search system can obtain stored information that is associated with only the threshold number of sorted search results.

As will be described, optionally the order-preserved encrypted forms of input values can be split according to a quorum based secret sharing process. For example, the quorum can be related to a number of nodes in the search system. As an example, the search system may include 5 nodes (e.g., server systems), and each node can receive a respective secret share of each secret (e.g., each order-preserved encrypted form of an input value). To generate the secret, secret shares from a quorum of the nodes can be required. Examples of a quorum can include a majority of the nodes, a particular threshold percentage of the nodes (e.g., 25%, 33%), and so on. In this way, the quorum based secret sharing process can ensure that any compromise of one node will not enable an attacker to exploit the order-preserved encrypted forms of the input values. In this way, an attacker will be limited in ability to determine associated plaintext input values.

Example Technical Benefits

As described above, particular insecure search systems may index, and store, information in plaintext. That is, an example insecure search system may maintain plaintext indexing information associated with stored information (e.g., records, documents, and so on). The indexing information may, as an example, include inverted indexes (e.g., an index, for example generated by Lucene, which indicates particular records or documents that include particular terms). Based on the indexing information, search requests identifying search criteria may be processed by the example insecure search system to obtain search results. As an example, the example insecure search system can utilize the inverted indexes to locate the search criteria, and then obtain corresponding documents, records, and so on.

Since these insecure search systems index, and store, information in plaintext, they may be inapplicable for storing sensitive information. For example, an attacker may be able to compromise an insecure search system and have direct access to stored information. Additionally, these insecure search systems may be inapplicable for situations in which they are to be connected to a publicly accessible network (e.g., the internet). For example, a search system may respond to search requests from clients (e.g., user devices, automatic requests generated by an application programming interface (API), and so on) received over the internet. This greater public exposure can increase a risk of compromise by an attacker as compared to, for example, a search system included in a network controlled by a particular entity.

As illustrated in FIG. 1A, the system described herein can further enable a demarcation between a search system that indexes information (e.g., insecure indexing system 150), and a data storage system that stores the information (e.g., secure data storage system 130). As will be described, the system can interface between the search system and the data storage system. For example, the system can be an intermediate system that receives search requests from clients, interfaces with the indexing system and data storage system, and provides search results to the clients. In this way, if an attacker compromises the indexing system, the attacker will merely be able to view cryptographically transformed indexing information. Additionally, if the attacker compromises the data storage system, the attacker will only have access to encrypted items of information, such as documents, records, and so on.

Therefore, the techniques described herein address and solve problems arising out of search system technology. For example, search systems can be improved such that secure and/or confidential information can be safely stored and be made searchable/sortable. Additionally, these search systems can be largely 'off'-the-shelf search systems (e.g., ElasticSearch) which, in combination with the system described herein, can be rapidly improved through interactions with the system.

Furthermore, in contrast with other example systems, the system as described herein is associated with several technical benefits. That is, the unique combination of methods, systems, described herein, enable improvements in search system technology over other combinations.

For example, as described above the system can receive requests to store information from clients, and generate HMACs of values included in the information. These HMACs are then provided to a search system to be indexed. While HMACs provide great security, the resulting HMACs cannot be easily compared to determine ranges, minimum values, maximum values, and so on. Therefore, an example system that merely causes indexing of HMACs will miss functionality described herein (e.g., sorting). Similarly, an example system that utilizes order-preserving encryption to index information will be less secure than the system described herein. For example, an attacker may be able to reconstruct plaintext values of encrypted information based on sufficient knowledge of order. Additionally, an example system that utilizes a quorum based secret sharing process (e.g., as described above) to index information, will be forced to have a quorum of its index system nodes always involved for search requests. That is, to access the indexing information, a quorum of index system nodes will be required to provide their respective secret shares. These secret shares can then be processed to obtain order-preserved encrypted values, which can be utilized to identify search results and then to sort according to sort criteria.

The system described herein improves upon these example systems and minimizes potential disadvantages. For example, because each value is indexed as an HMAC, security can be maintained at a higher level than using just order-preserved encryption. Similarly, because order-preserved encryption is also utilized by the system, the system can easily sort items of information. Since the order-preserved encrypted values are spread across multiple index system nodes according to a quorum based secret sharing process, the security of the order-preserved encrypted values is increase. Additionally, since HMACs are utilized to hash information, the quorum of index system nodes is only required to sort information. Therefore, the quorum of index system nodes can provide only secret shares related to (1) the identified search results (e.g., rapidly identified from HMACs) and values specific to, for example, a particular field indicated in sort criteria (e.g., only values related to age, or name, and so on). In this way, substantial bandwidth and processing savings can be made via implementation of the system described herein.

FIG. 1A is a block diagram of an example intermediate encryption retrieval system 100 storing received information. The intermediate encryption retrieval system 100 can be a system of one or more computers, one or more virtual machines executing on a system of one or more computers, and so on. As will be described, the intermediate encryption retrieval system 100 can enable secure storage, and access, of items of information such as documents, records, and so on.

As illustrated in the example of FIG. 1A, the intermediate encryption retrieval system 100 is in communication with a secure data storage system 130 and an insecure indexing system 150. For example, the intermediate encryption retrieval system 100 can communicate with the systems 130, 150, via a network (e.g., a Local Area Network, a Wide Area Network, the internet, virtual network, and so on). Additionally, the intermediate encryption retrieval system 100 can receive requests (e.g., storage request 102) from clients, such as user devices of users, client requests automatically generated via application programming interface (API) calls from outside systems, and so on. As illustrated, a trust boundary 102 is included. This trust boundary 102 can represent that the intermediate encryption retrieval system 100 is trusted to utilize plaintext information received from clients, while the indexing system 150 is not. Optionally, the secure data storage system 130 can be trusted to receive plaintext information, and encrypt it for storage, or optionally the secure data storage system 130 may be insecure, and receive encrypted information from the intermediate encryption retrieval system 100.

Figure 1B:
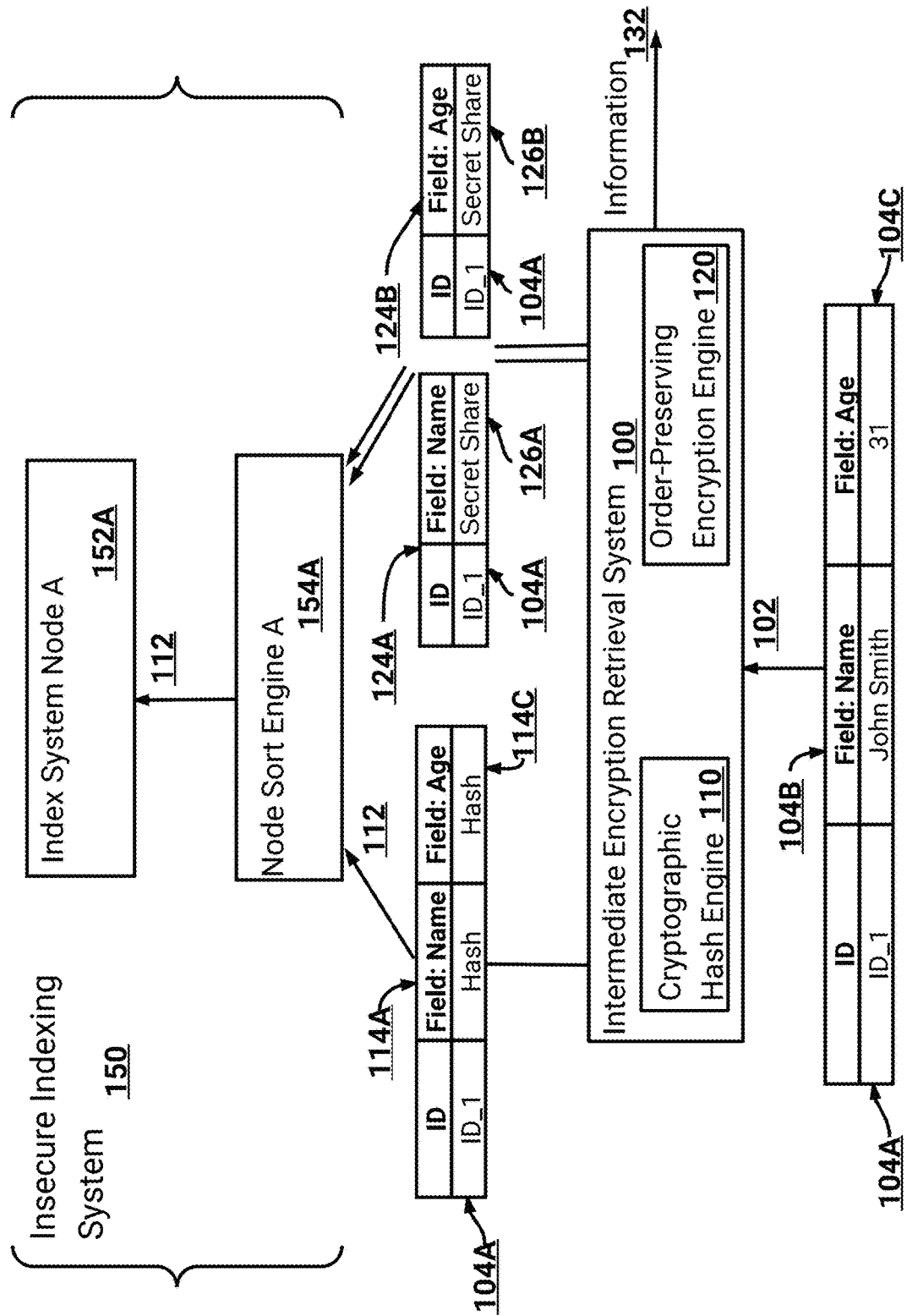
FIG. 1B is a block diagram of an example intermediate encryption retrieval system storing example information.

The storage request 102 can indicate that the intermediate encryption retrieval system 100 is to store information included in the request 102, or referenced in the request 102. For example, the storage request 102 can be provided with structured or unstructured information, or be provided with a reference (e.g., hyperlink) to a network location at which structured or unstructured information is accessible. As described above, structured information can include database tables, JavaScript Object Notation (JSON) information, and so on. An example of information associated with a storage request 102 is illustrated in FIG. 1B, and described below.

As an added security layer, the intermediate encryption retrieval system 100 can require an authorization token be provided along with the storage request 102. The authorization token can provide confirmation that the requesting client is authorized to utilize the intermediate encryption retrieval system 100. For example, a client can be required to authenticate with an identity provider, such as a system that implements OAuth, OASIS SAML, and so on. The identity provider can provide an authorization token to the client, which can be provided with the storage request 102. As an example of an authorization token, the token can be associated with an expiration date and include an identity associated with the client. Upon confirmation of the authorization token by the intermediate encryption retrieval system 100, the system 100 can cause storage and indexing of the received information.

As described above, the intermediate encryption retrieval system 100 can cause the information associated with the storage request 102 to be cryptographically transformed prior to being indexed. For example, the insecure indexing system 150 can generate indexing information (e.g., inverted indexes) upon receipt of information from the intermediate encryption retrieval system 100. The insecure indexing system 150 can be an example of a search system (e.g., an ElasticSearch system) that includes multiple index system nodes 152A-152N. Each of these index system nodes can be a system of one or more computers, logical nodes of computing resources executing on systems of one or more computers, and so on. The index system nodes 152A-152N can be in communication with each other over one or more networks, such as Local Area Networks, Wide Area Networks, virtual networks, the internet, and so on. The index system nodes 152A-152N can therefore form a distributed system architecture, and each can include one or more shards of information that are being maintained by the insecure indexing system 150.

The intermediate encryption retrieval system 100 includes a cryptographic hash engine 110 that can process the received information 102. For example, the cryptographic hash engine 110 can obtain Hash-based message authentication code (HMAC) values (hereinafter HMACs) of the received information. As an example, the cryptographic hash engine 110 can be in communication with a system associated with securely maintaining cryptographic keys (e.g., a key server). The cryptographic hash engine 110 can provide a request to the key server for a cryptographic key (e.g., the request can include authorization information), and the engine 110 can receive a cryptographic key. Based on the cryptographic key, the cryptographic hash engine 110 can compute HMACs utilizing, at least in part, a hash function. Example hash functions can include MD5, SHA-1, SHA-2, SHA-3, and so on. As described above, the received information 102 can include one or more fields each associated with one or more values. Optionally, the cryptographic hash engine 110 can obtain HMACs of the included values while preserving the included fields in plaintext. For example, a field can be "Model of Car," and values can correspond to specific models of cars. The cryptographic hash engine 110 can obtain HMACs of the specific models, and maintain the identifier "Model of Car" in plaintext. Optionally, the cryptographic hash engine 110 can obtain HMACs of the fields. An example of obtaining HMACs of received information is described in more detail below, with respect to FIG. 1B.

Upon replacing, at least, the values included in the received information 102, the intermediate encryption retrieval system 100 can provide cryptographic hash information 112 to the insecure indexing system 150. As illustrated, each index system node 152A-152N can receive the cryptographic hash information 112. In this way, any of the index system nodes 152A-152N can process search requests, such that the insecure indexing system 150 can maintain a high degree of availability.

The intermediate encryption retrieval system 100 further includes an order-preserving encryption engine 120 that can perform an order-preserving encryption process on the received information 102. With respect to the example of the received information 102 including a field of "Model of Car," along with values corresponding to specific models, the engine 120 can perform the order-preserving encryption process on each value (e.g., model of car). In this way, the generated ciphertext can be sorted equivalently to plaintext car models (e.g., sorted alphabetically). As will be described in more detail below, with respect to FIG. 1B, the engine 120 can generate order-preserved encrypted forms of all values associated with a same field. For example, if the received information 102 includes two fields, the engine 120 can generate two resulting structured datasets (e.g., order-preserved secrets 122), with each dataset including respective order-preserved encrypted forms of values for a respective field.

As illustrated, the order-preserving encryption engine 102 can therefore generate one or more order-preserved secrets 122. Each order-preserved secret 102 can specify a particular field included in the received information 102 along with an order-preserved encrypted form of a respective value associated with the particular field. Optionally, the specified field can be replaced with an associated HMAC to reduce insights into the received information 102. The order-preserving encryption engine 102 can separate the order-preserved secrets 122 into N secret shares according to a secret sharing scheme, and can provide each secret share to a respective index system node A-N 152A-152N. Examples of a secret sharing scheme can include Shamir's scheme, Blakley's scheme, All-or-nothing transforms, and so on. In this way, to obtain an ordering associated with values included in received information 102, secret shares 122 from at least a quorum of the index system nodes are required.

In this way, the insecure indexing system 150 can index the received cryptographic hash information 112, and can maintain secret shares 122A-122N for utilization in determining orderings of values. As will be described below, with respect to FIGS. 2A-2C, the insecure indexing system 150 can utilize the cryptographic hash information 112 to obtain search results that match requested search criteria. Additionally, the insecure indexing system 150 can then apply requested sort criteria based on the secret shares 122A-122N.

FIG. 1A further includes a secure data storage system 130, which as an example can be a distributed database, a storage subsystem, and so on. For example, the secure data storage system 130 can be a relational database, NoSQL database, and so on. The secure data storage system 130 can be a key-value database system that provides access to stored information, and optionally does not provide search functionality. The intermediate encryption retrieval system 100 can provide the received information 102 to the secure data storage system 130 for storage. For example, the intermediate encryption retrieval system 100 can obtain a cryptographic key (e.g., from a key server as described above) and can encrypt the received information 102. The encrypted information 132 can then be provided for storage in the secure data storage system 130. Optionally, the secure data storage system 130 can receive the information 132 in plaintext, and can utilize the key server to encrypt the information (e.g., as described above). The items of information (e.g., records, documents) stored in the secure data storage system 130 can be associated with unique identifiers. These unique identifiers can be utilized by the secure data storage system 130 as database key-values, and as will be described, the intermediate encryption retrieval system 100 can request stored information based on these unique identifiers.

FIG. 1B is a block diagram of an example intermediate encryption retrieval system 100 storing example information. As described above with respect FIG. 1A, the intermediate encryption retrieval system 100 can receive storage requests from clients, and cause storing of associated information. In the example of FIG. 1B, a client has provided an item of information 102 for storage (e.g., as described above, a document, record, and so on) which includes two fields 104B (e.g., 'Name', 'Age') and associated values 104C (e.g., 'John Smith', '31'). While the example of FIG. 1B illustrates a table, it should be understood that the information 102 can, as described above, be other forms of structured data (e.g., JavaScript Object Notation) or unstructured data. Additionally, the information 102 can be associated with storing images, videos, or any arbitrary information, and the illustrated information can represent metadata associated with the arbitrary information (e.g., the arbitrary information can be associated with a person 'John Smith aged 31').

A unique identifier 104A is illustrated as being associated with the item of information 102. As will be described further below, the unique identifier 104A can be utilized for indexing the information 102 and storing the information 102. For example, the index system node A 152A can store the unique identifier 104A as being associated with the item of information 102 (e.g., a cryptographically transformed form of the information 102). Based on the unique identifier 104A, the information 102 can be later retrieved from the secure data storage system 130. For example, the secure data storage system 130 can receive the information 102 for storage, and can associate the unique identifier 104A with the information 102 (e.g., the unique identifier 104A can be a key utilized for storage and retrieval of the information 102).

The unique identifier 104A can optionally be provided with the information 102 by a client, or can be generated by the intermediate encryption retrieval system 100. As an example, the information 102 can include a field indicating a particular unique identifier (e.g., 'ID_1'). As another example, upon receipt of a storage request by a client, the intermediate encryption retrieval system 100 can generate a unique identifier 104A to be associated with the information 102. Optionally, the intermediate encryption retrieval system 100 can ensure that a unique identifier 104A is unique (e.g., the system 100 can monitor identifiers assigned to received items of information), and if not, can update the unique identifier prior to indexing and storage. Optionally, the intermediate encryption retrieval system 100 can maintain mapping information between unique identifiers provided by clients, and unique identifiers utilized for indexing and storage. Optionally, the intermediate encryption retrieval system 100 can generate a unique identifier based on performing a cryptographic hash process on the information. In this way, if the intermediate encryption retrieval system 100 receives information storage requests with same identifiers, the intermediate encryption retrieval system 100 can generate new identifiers to be associated with the information for indexing and storage purposes.

As described above, the intermediate encryption retrieval system 100 includes a cryptographic hash engine 110 that can transform the information 102 for indexing. For example, the cryptographic hash engine 110 can replace the values 104C included in the information 102 (e.g., 'John Smith', '31') with cryptographically processed versions. As described above with respect to FIG. 1A, the cryptographic hash engine 110 can obtain HMACs of the values 104C. As an example, FIG. 1B illustrates that the values 104C have been replaced with their cryptographic hash values 114C. As described above, the intermediate encryption retrieval system 100 can be in communication with an outside system (e.g., a key-server) to securely receive, and utilize, cryptographic keys. In this way, the cryptographic hash engine 110 can perform a secure cryptographic hash process to obtain cryptographic hash information 112. Optionally, the fields 114A can be preserved such that the identifiers associated with the fields can be stored as plaintext. Optionally, the fields 114A can be replaced with HMACs of their respective identifiers (e.g., 'Name', 'Age'). Since, as will be described further, the unique identifier 114A is utilized to identify the information 102, the unique identifier 114A can be preserved as plaintext.

The intermediate encryption retrieval system 100 further includes an order-preserving encryption engine 120 that can transform the information 102 to preserve sorting functionality. Sorting will be further described below, with respect to FIGS. 2A-2C. As described above, the order-preserving encryption engine 120 can apply an order-preserving encryption process on each value 104C to obtain corresponding order-preserved ciphertext. That is, the value '31' as illustrated in FIG. 1B can be transformed into ciphertext according to the order-preserving encryption process. Since the ciphertext is order-preserving, the ciphertext can be compared with other ciphertext. These comparisons will be equivalent with comparing the corresponding plaintext values. In this way, sorting of the values can be performed on the ciphertext without access to the plaintext values. The order preserving encryption engine 120 can receive cryptographic keys from an outside system (e.g., a trusted key-server, as described above) to generate resulting ciphertexts. Optionally, the intermediate encryption retrieval system 100 can provide the received information 102 to the outside system for processing (e.g., via a network, such as the internet), and can receive order-preserved ciphertexts in response. That is, the processing can be offloaded to the key-server, or other cryptographic service provider.

The order-preserving encryption engine 120 therefore can generate a secret for each of the received values 104C. In this specification, a secret represents ciphertext associated with performance of an order-preserved encryption process on one or more received values 104C. The engine 120 can generate individual secret shares according to a secret sharing process, with each index system node (e.g., nodes 152A-152N as illustrated in FIG. 1) receiving a respective secret share. For example, as illustrated in FIG. 1B the input value 104C 'John Smith' has been replaced with an associated secret share 126A. This engine 120 can then provide the secret share 126A to index system node A 152A.

The number of secret shares generated by the order-preserving encryption engine 120 can be determined based on a number of index system nodes included in the insecure indexing system 150. For example, the engine 120 can obtain information from indicating a number of index system nodes, and generate a number of secret shares equivalent to a majority of the index system nodes. As an example, the engine 120 can generate a number of secret shares equivalent to floor $$\left(\frac{\# \text{ Nodes}}{2} + 1\right).$$

As described above, with respect to FIG. 1A, each of these secret shares can be provided to a respective index system node. As another example, the engine 120 can generate less than, or greater than, a minimum majority of secret shares (e.g., as specified by a user of the system).

As illustrated in FIG. 1B, two items of information are provided to the insecure indexing system 150. A first item of information 124A includes a secret share 126A associated with the field 'Name,' while a second item of information 126B includes a secret share 126B associated with the field 'Age'. Each of these items of information 126A, 126B, includes a same unique identifier 104A, such that the secret shares 126A, 126B, can be associated with the received information 102. As will be described below, a search request received from a client can indicate sort criteria. For example, a client can request that search results be sorted based on values associated with a particular field (e.g., sorted by 'Age'). Therefore, the order-preserving encryption engine 120 can generate a number of items of information according to a number of fields.

The cryptographic hash information 112 and order-preserved items of information 124A, 124B, can then be provided by the intermediate encryption retrieval system 100 to the insecure indexing system 150. For example, the information 112, 124A, 124B, can be provided at a same time to the insecure indexing system 150, or optionally in one or more requests to the system 150. As illustrated, a node sort engine A 154A is illustrated as receiving the information 112, 124A, 124B. As will be described below, with respect to FIGS. 2A-2C, the node sort engine A 154A can provide sorted search results to the intermediate encryption retrieval system 100 in response to search requests. For example, index system node A 152A can obtain search results corresponding to search criteria, and the node sort engine A 154A can sort the search results according to sort criteria. The node sort engine A 154A may be an agent (e.g., a software agent) executing on the index system node A 152A. The node sort engine A 154A may also be a separate system in communication with the index system node A 152A via a network (e.g., LAN, WAN, virtual network, and so on). Additionally, each index system node 152A-152N (e.g., as illustrated in FIG. 1A), may include a respective node sort engine. The node sort engine A 154A can be an interface between the intermediate encryption retrieval system 100 and index system node A 152A. For example, the node sort engine A 154A can intercept requests (e.g., indexing requests, for example received from system 100) to index system node A 152. Optionally, and as will be described below, a node sort engine can be associated with multiple index system nodes. Optionally, the node sort engine A 154 can receive information from a front-end node (e.g., a server system, software executing on a system) associated with the insecure indexing system 150. For example, the intermediate encryption retrieval system 100 can provide the cryptographic hash information 112, order-preserved items of information 124A, 124B, to the insecure indexing system 150, which can then provide the information to one or more node sort engines.

The node sort engine A 154A can receive the order-preserved items of information 124A, 124B, and store the information. Similarly, remaining node sort engines can receive the information 124A, 124B, and store the information. Optionally, the node sort engine A 154A can have local storage, such as one or more databases, or can be in communication with a network accessible storage system. Optionally, the node sort engine A 154A can cache the received information 124A, 124B, for rapid access to the information. With respect to the cryptographic hash information 112, the node sort engine A 154A can provide the information 112 to index system node A 152A for indexing. The index system node A 152A can, as described above, index the included HMAC values.

Optionally, node sort engine A 154A can be associated with multiple index system nodes. For example, each associated index system node can include a share of overall indexing information (e.g., one or more shards of information). In this way, each index system node can be utilized to identify differing search results, and the node sort engine A 154A can cause ordering of the search results. In this implementation, node sort engine A 154A can optionally maintain information indicating which associated index system node stores indexing information related to search criteria. For example, particular ranges of unique identifiers can be stored by respective index system nodes, and so on.

In this way, the intermediate encryption retrieval system 100 can receive storage requests from clients, and cause the information to be transformed for indexing by the insecure indexing system 150. Similarly, the intermediate retrieval system 100 can provide received information 132 to a secure data storage system 130 (e.g. as illustrated in FIG. 1A), for later retrieval. As will be described below, the intermediate encryption retrieval system 100 can receive search requests, and provide search results in response.

Figure 2A:
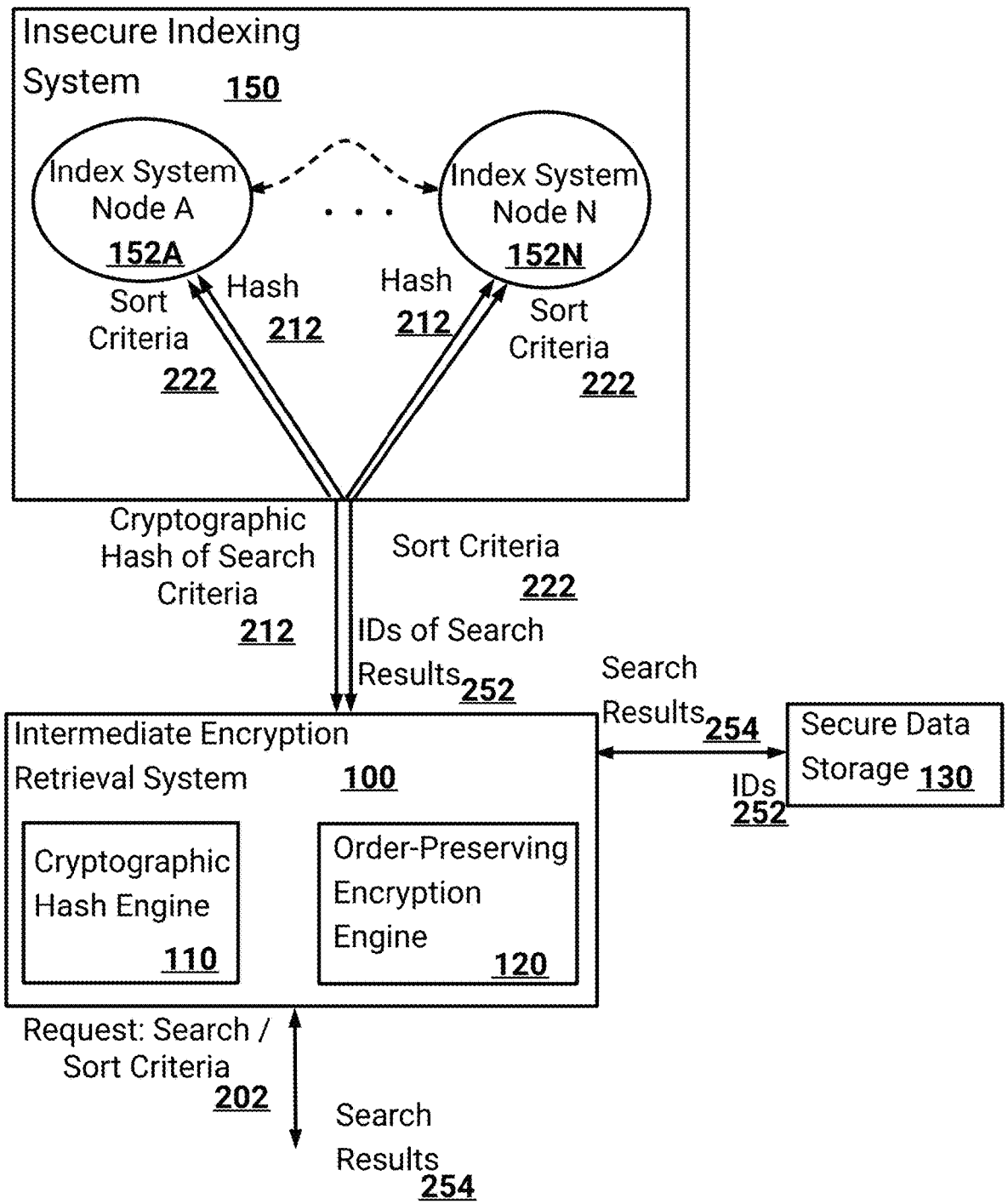
FIG. 2A is a block diagram of an example intermediate encryption retrieval system performing a search request.

FIG. 2A is a block diagram of an example intermediate encryption retrieval system 100 performing a search request 202. As illustrated, a client can provide a search request 202 to the intermediate encryption retrieval system 100, and in response the system 100 can provide search results 254. The search requests 202 can include search criteria, such as information to be matched (e.g., values included in documents, records, and so on), and sort criteria (e.g., information indicating how search results are to be sorted). As described above, with respect to FIG. 1A, the intermediate encryption retrieval system 100 can obtain assurances that the requesting client is authorized to obtain search results. As an example, an authorization token can be provided along with the search request. Additionally, the intermediate encryption retrieval system 100 can utilize the authorization token to determine access rights associated with the client (e.g., role-based access rights, access control list information), and ensure that the client is authorized to provide the search request 202.

As described above, the search request 202 can indicate search criteria, and the cryptographic hash engine 110 can generate cryptographic hashes 212 of the search criteria. That is, the cryptographic hash engine 110 can generate HMACs of the search criteria, for example utilizing an outside system (e.g., key-server) as described in FIGS. 1A-1B. Since the insecure indexing system 150 indexes information according to cryptograph hashes, the intermediate encryption retrieval system 100 similarly generates cryptographic hashes 212 of the search criteria. As described above, optionally the intermediate encryption retrieval system 100 can generate HMACs of search criteria within a threshold distance (e.g., Levenshtein distance). Additionally, the system 100 can identify potential misspellings, other spellings that can be utilized, and so on, and generate alternative HMACs. The system 100 can identify search results related to each alternative HMAC, and optionally provide them to the requesting client.

The search request 202 can further indicate sort criteria, which for example can indicate a particular field is to be sorted. Optionally, the sort criteria can be utilized to obtain search results with values in a particular range. For example, the sort criterial can indicate that search results are to be sorted according to age. The sort criteria can further indicate that search results are only to be obtained for persons specified between ages x and y (e.g., 23 and 35). The intermediate encryption retrieval system 100 can perform an order-preserving encryption process on the values x and y (e.g., 23, 35), and provide the resulting to ciphertext to insecure indexing system 150. In this way, the insecure indexing system 150 can compare the ciphertext with search results, and determine search results that comport with the specified range.

Upon generating the cryptographic hashes 212, the intermediate encryption retrieval system 100 can provide the cryptographic hashes 212, along with the sort criteria 222, to the insecure indexing system 150. As will be described further in FIGS. 2B-2C, the index system nodes 152A-152N can identify search results corresponding to the search criteria 222. A quorum of the index system nodes 152A-152N can identify search results, and the insecure indexing system 150 can utilize respective secret shares from the quorum of index system nodes to determine sorting information associated with the search results. For example, if the sort criteria 222 indicates that search results are to be sorted according to a particular field (e.g., 'Name' or 'Age', with respect to the example of FIGS. 1A-1B), the sort criteria can indicate a name of the field. The insecure indexing system 150 can then utilize secret shares associated with the indicated field to determine an ordering of the identified search results.

In this way, the insecure indexing system 150 can provide unique identifiers of search results 252 (e.g., unique identifiers of sorted search results) to the secure data storage system 130. As described above, the secure data storage system 130 can store information according to unique identifier (e.g., a unique identifier can be a key associated with respective items of information). In response to the received unique identifiers 252, the secure data storage system 130 can provide corresponding search results 254. As described above, the secure data storage system 130 can store information in an encrypted form, and can optionally decrypt the search results 254 to be provided to the intermediate encryption retrieval system 100. (e.g., plaintext search results). Optionally, information can be encrypted prior to receipt by the secure data storage system 130. In this case, the secure data storage system 130 can provide encrypted search results 254 to the intermediate encryption retrieval system 100, which can then decrypt the search results 254. The search results 254 can then be provided to the requesting client.

Figure 2B:
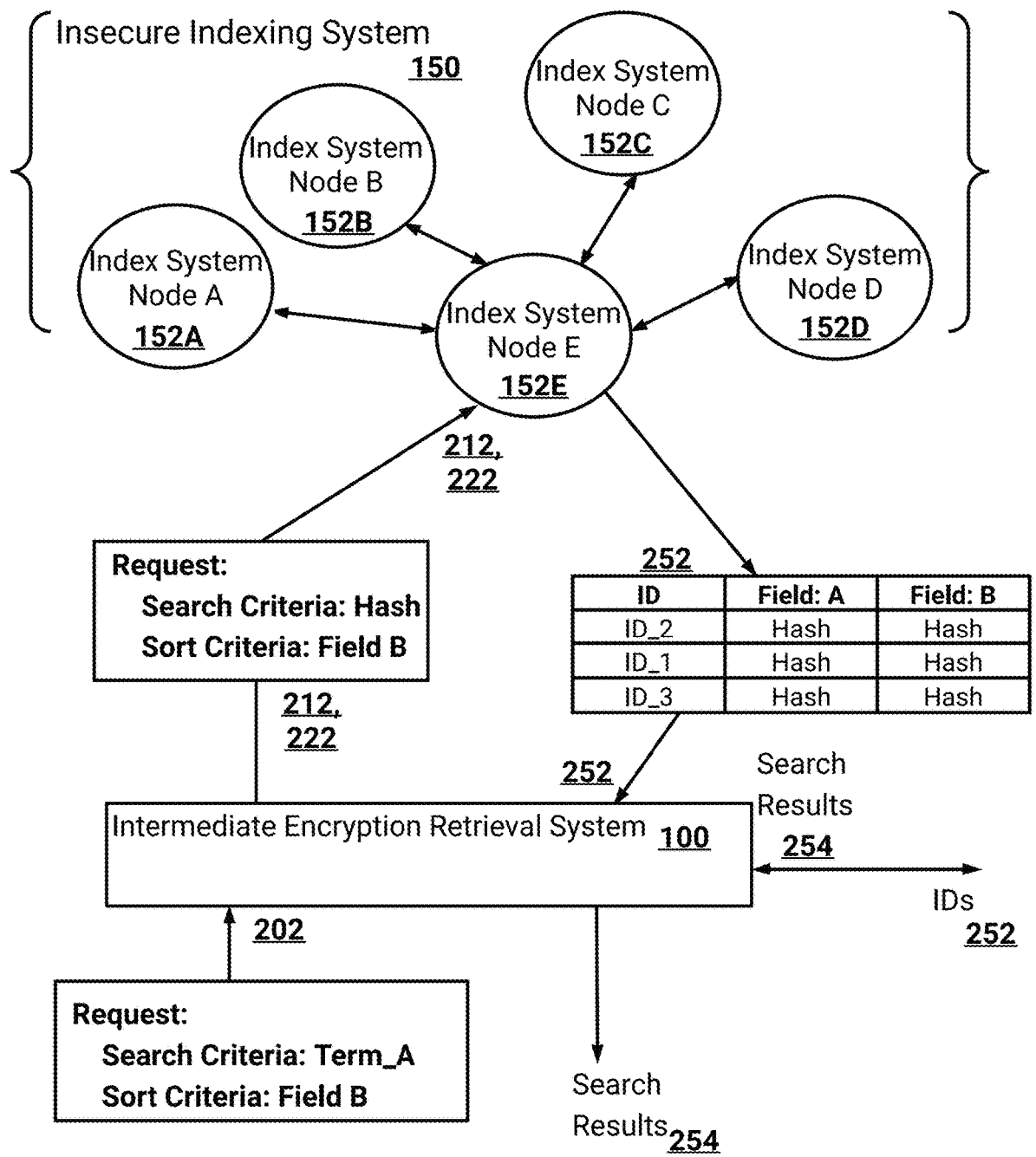
FIG. 2B is a block diagram of an example intermediate encryption retrieval system obtaining search results.

FIG. 2B is a block diagram of an example intermediate encryption retrieval system 100 obtaining search results 254. FIG. 2B illustrates search request 202 as indicating particular search criteria 212, and particular sort criteria 222 (e.g., 'Field B'). As described above, the insecure indexing system 150 can obtain unique identifiers 252 of search results that match the search criteria 212, and which are sorted according to the sort criteria 222. For example, the insecure indexing system 150 can provide unique identifiers 252 of a threshold number of search results according to the search criteria 212 and sort criteria 222.

A particular index system node can be selected to receive the search criteria 212 and sort criteria 222, and then subsequently provide unique identifiers 252 of corresponding search results. For example, load balancing can be performed by the insecure indexing system 150 (e.g., a front-end node, as described above), such that different index system nodes can be selected to process successive search requests (e.g., in a round-robin fashion). Additionally, a selected index system node can require that a request to obtain search results, for example from the intermediate encryption retrieval system 100, be digitally signed as being associated with the system 100 (e.g., based on public key infrastructure (PKI)). In this way, the selected index system node can discard requests that are not authorized.

As illustrated, index system node E 152E has been selected, and can identify search results associated with the search criteria 212. For example, index system node E 152E can access indexing information, for example as described above in FIGS. 1A-1B, and identify matching search results. Additionally, insecure system node E 152E can provide requests to the remaining index system nodes 152A-152D to also identify search results. Insecure system node E 152 can wait until a quorum of index system nodes respond, and can indicate to the remaining nodes that they are not to identify search results. The remaining index system nodes can also ensure that the request is associated with the intermediate encryption retrieval system 100. For example, the remaining index system nodes can verify that the request is signed by the intermediate encryption retrieval system 100.

Each of the quorum of index system nodes can then identify search results corresponding to the search criteria 212. Upon identification of the search results, the index system nodes can utilize the indicated sort criteria 222 to obtain respective secret shares for the search results, with the secret shares being associated with the sort criteria 222. The quorum of index system nodes can then provide the respective secret shares to index system node E 152. As will be described in more detail below, with respect to FIG. 2C, index system node E 152 can then determine an ordering associated with identified search results. As illustrated, index system node E 152E has determined unique identifiers 252 of search results, and has provided them to the intermediate encryption retrieval system 100. While the example of FIG. 2B includes values associated with Fields (e.g., Field: A, Field: B), optionally index system node E 152E can include just the unique identifiers (e.g., sorted according to the sort criteria 222).

As described above, with respect to FIG. 1A, the intermediate encryption retrieval system 100 can provide the received unique identifiers 252 to a secure data storage system 130 (e.g., as illustrated in FIG. 2A), and receive search results 254. The system 100 can then provide the search results to the requesting client in response to the request 202.

Figure 2C:
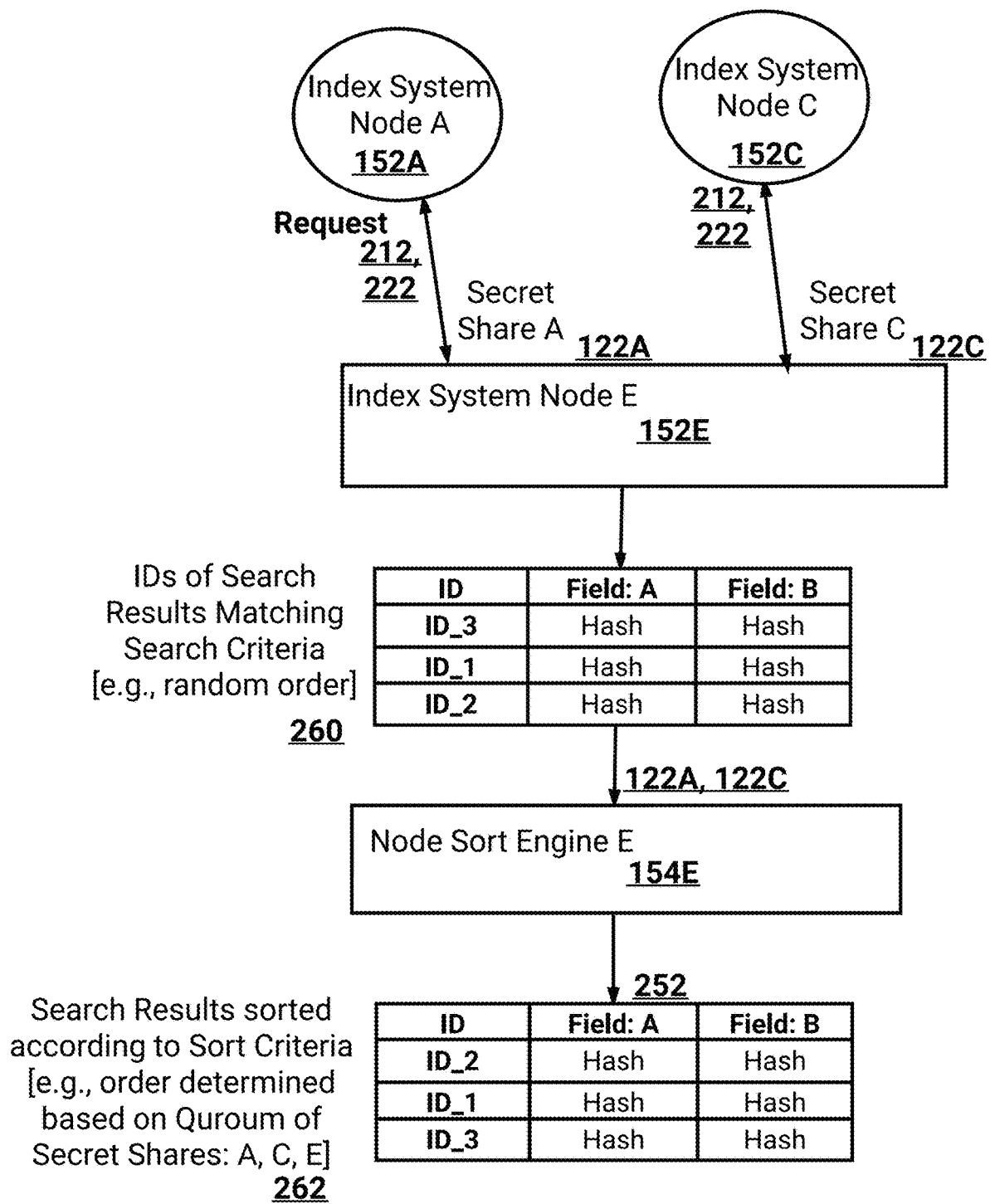
FIG. 2C is a block diagram of an example index system node obtaining sorted search results.

FIG. 2C is a block diagram of an example index system node 152E obtaining sorted search results 252. As described above, with respect to FIG. 2B, index system node E 152E can provide a search request indicating search criteria 212 and sort criteria 222 to, at least, a quorum of index system nodes. For example, in the example of FIGS. 2A-2C there are 5 index system nodes. If the quorum is indicated as being a majority, then three index system nodes are required. As illustrated, index system node A 152A and index system node C 152C responded to index system node E 152E. For example, index system nodes A, C, may have responded first.

Each of the index system nodes A, C, E, can utilize the search criteria to identify corresponding search results. For example, index system node A 152A can identify unique identifiers associated with corresponding search results. Similarly, index system node C 152C can identify search results, and index system node E 152E can identify search results. However, these identified search results will not be sorted according to the sort criteria 222.

To sort the search results, secret shares associated with the search results are required from index system nodes A, C, E. Since the search results identified by each of the index system nodes A, C, E, include unique identifiers associated with the search results, secret shares associated with same unique identifiers can be obtained by the index system nodes A, C, E. Additionally, the sort criteria can indicate particular secret shares to be utilized. For example, the sort criteria 222 can indicate that a particular field is to be used for sorting. Since values for this particular field will be sorted, index system nodes A and C can obtain secret shares of values associated only with this particular field. To be efficient, index system nodes A and C can provide only these secret shares to index system node E 152E.

As illustrated, index system node E 152E has determined unique identifiers 260 associated with the search criteria 212. That is, index system node E 152E has determined unique identifiers associated with HMACs of plaintext values, and does not itself have access to the plaintext values. As illustrated in FIG. 2B, the sort criteria 222 indicates that search results are to be sorted according to field 'B'. To determine an ordering of the unique identifiers 260, node sort engine E 152E can utilize received secret shares A 122A, secret shares C 122C, and its own stored secret shares, to determine an ordering associated with the unique identifiers. For example, based on the quorum of secret shares, node sort engine E 154E can obtain the order preserved encrypted secrets associated with the plaintext values. Node sort engine E can then sort the order preserved encrypted secrets, and determine a corresponding ordering of the unique identifiers. Therefore, unique identifiers 262 associated with the sorted search results can be obtained, and provided to the intermediate encryption retrieval system 100.

Optionally, node sort engine E 154E can initially receive the search request 202 from the intermediate encryption retrieval system 100. Node sort engine E 154E can then provide the search criteria 212 and sort criteria 222 to respective node sort engines of the remaining index system nodes. Each of the node sort engines can provide the search criteria to their respective index system nodes, while stripping out the sort criteria. That is, as described above with respect to FIG. 1B, each index system node can execute an agent (e.g. custom software agent, such as a sandboxed software agent, executing on an otherwise off the shelf index system node) that implements a respective node sort engine. The node sort engines can therefore cause an index system node to obtain search results that match search criteria 212. Subsequently, the node sort engines can obtain unique identifiers associated with the search results, and obtain secret shares associated with the search results. In this way, the sorting can be separated from the indexing, such that only the node sort engines can obtain sorted search results 262.

Figure 3:
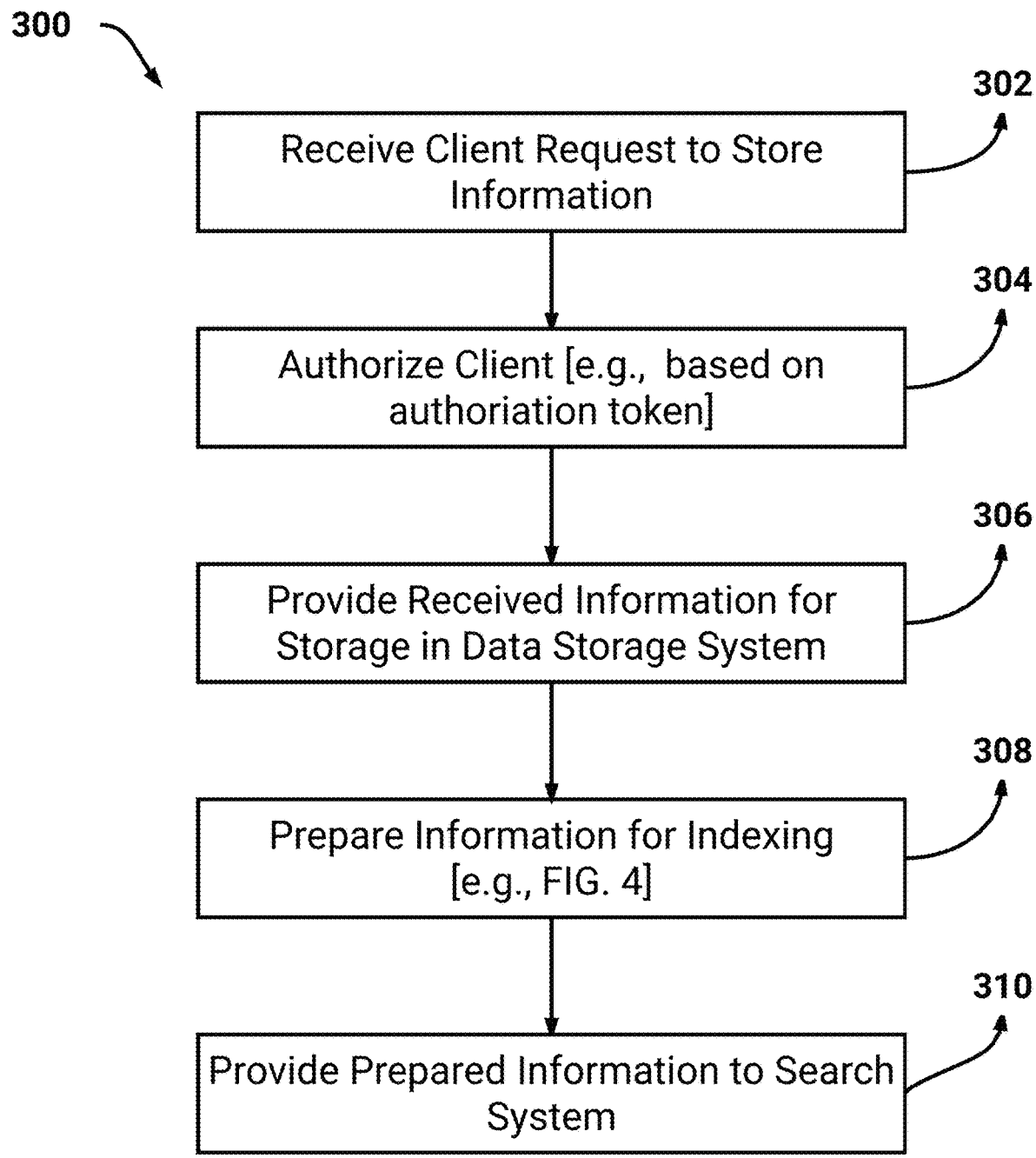
FIG. 3 is a flowchart of an example process for storing information in an example insecure indexing system.

FIG. 3 is a flowchart of an example process 300 for storing information in an example insecure indexing system. For convenience, the process 300 will be described as being performed by a system of one or more computers (e.g., intermediate encryption retrieval system 100).

The system receives a client request to store information (block 302). As described in FIGS. 1A-1B, the system can receive storage requests form clients. For example, user devices of users can utilize the system to store information (e.g., items of information). As another example, the system can storage receive requests from outside systems via utilization of particular application programming interface (API) calls.

The system authorizes the requesting client (block 304). As described above, the system can ensure that the received storage request includes an authorization token indicating that the client is authorized to provide storage requests. The system can discard the storage request upon an invalid authorization token being provided.

The system provides the received information for storage in a data storage system (block 306). As described in FIGS. 1A-1B, the system can provide the received information for storage in a data storage system. Optionally, the system can obtain a cryptographic key from an outside system (e.g., a key-server), and utilize the cryptographic key to encrypt the received information. Subsequent to encryption, the system can provide the encrypted information to the data storage system for storage. Optionally, the system can provide the received information as plaintext, via an encrypted connection (e.g., a secure sockets layer (SSL)) connection, and the data storage system can encrypt the received information.

As described above, the received information can be associated with a unique identifier. For example, the received information can indicate a unique identifier (e.g., a field included in the information can be associated with unique identifiers, and a value can indicate the unique identifier). As another example, the system can generate a unique identifier. When providing the received information to the data storage system, the system can associate the received information with the unique identifier.

The system prepares the information for indexing (block 308). As described above, and as described in FIG. 4 below, the system can prepare the information to be provided to a search system (e.g., the insecure indexing system 150). For example, the system can generate cryptographic hashes of values included in the received information, and can cause these cryptographic hashes to be indexed. Additionally, the system can perform an order-preserving encryption process on each value, and provide the resulting secrets to the search system.

The system provides the prepared information to the index system (block 310). As described above, with respect to FIGS. 1A-1B, the system can provide the prepared information to the search system.

Figure 4:
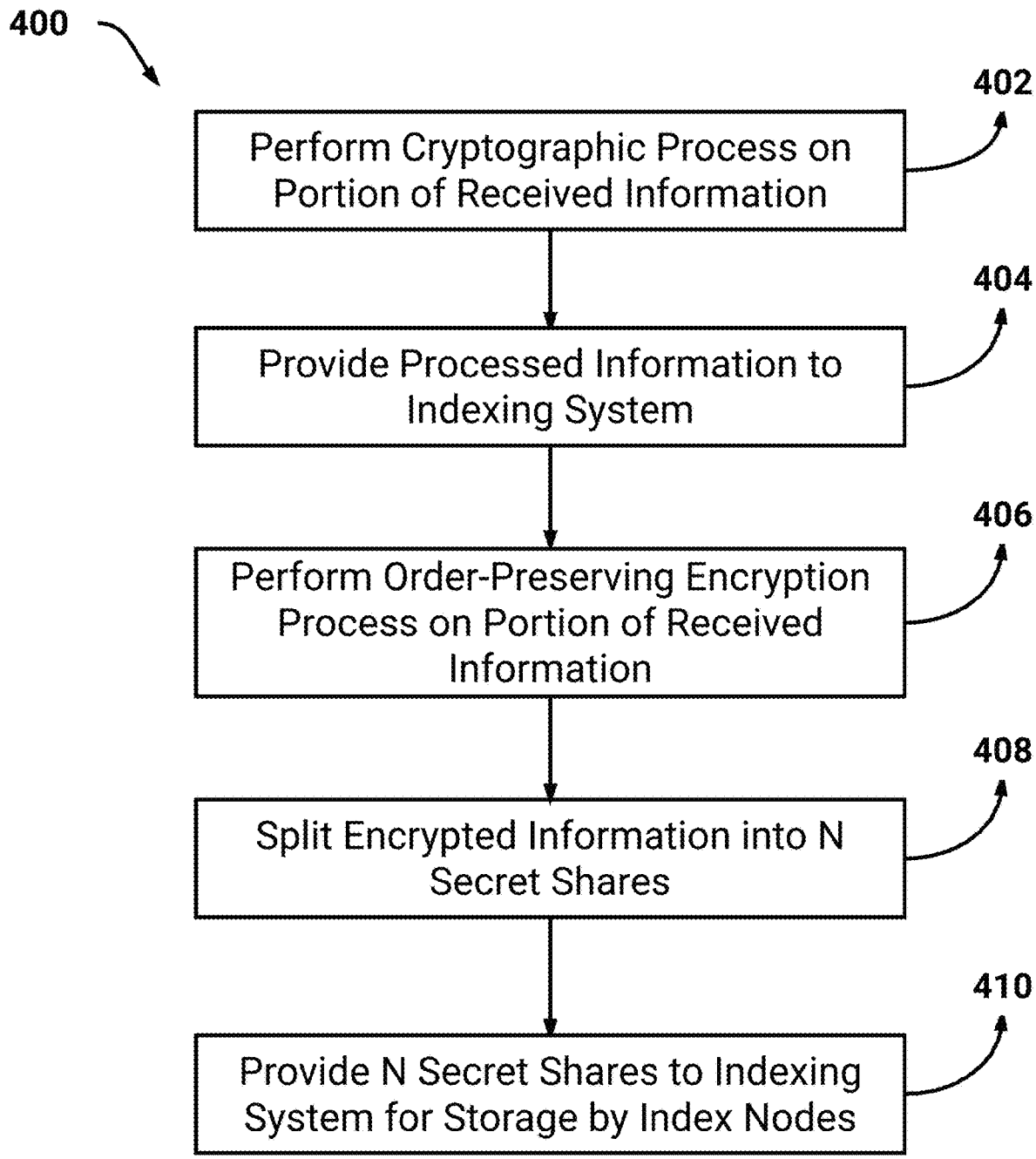
FIG. 4 is a flowchart of an example process for preparing information to be indexed in an example search system.

FIG. 4 is a flowchart of an example process 400 for preparing information to be indexed in an example search system (e.g., insecure indexing system 150). For convenience, the process 400 will be described as being performed by a system of one or more computers (e.g., the intermediate encryption retrieval system 100).

The system performs cryptographic process on a portion of the received information (block 402). As described above, the system can obtain keyed-hash message authentication codes (HMACs) associated with input values. The system can then generate information indicating same unique identifiers, fields, with HMACs of the input values. These HMACs can then be provided to the search system for indexing (block 404).

The system performs an order-preserving encryption process on a portion of the received information (block 406). The system can obtain order-preserving ciphertext associated with each of the input values. The system can then generate N secret shares for each order-preserving ciphertext (block 408). For example, the system can generate a secret share for each search node (e.g., index system node) associated with the search system. These secret shares can then be provided to the search system (block 410).

Figure 5:
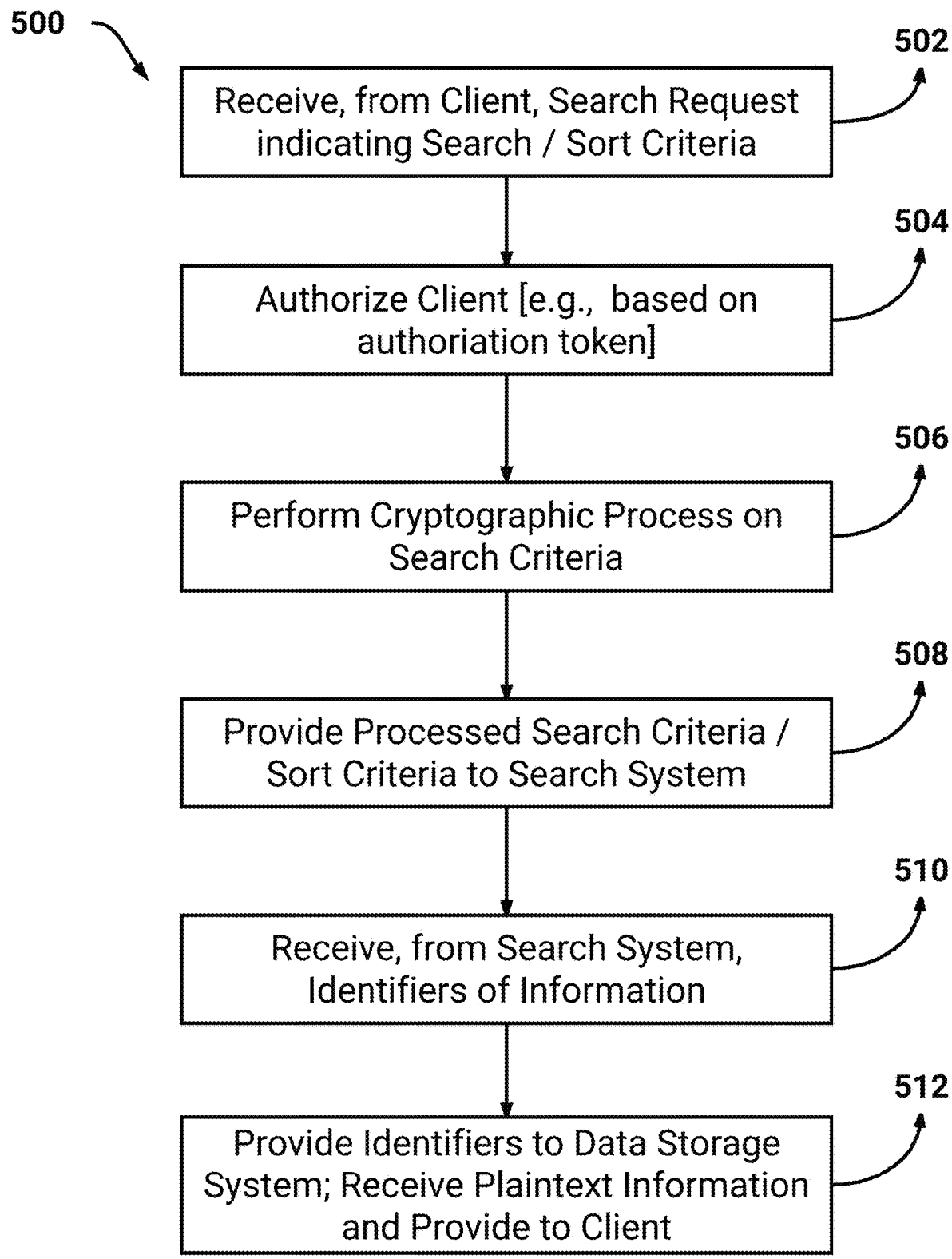
FIG. 5 is a flowchart of an example process for searching for information indexed in an example search system.

FIG. 5 is a flowchart of an example process 500 for searching for information indexed in an example search system (e.g., insecure indexing system 150). For convenience, the process 500 will be described as being performed by a system of one or more computers (e.g., the intermediate encryption retrieval system 100).

The system receives a search request from a client (block 502). As described above, the search request can indicate search criteria and sort criteria. The system can authorize the client (block 504), for example based on a received authorization token. Additionally, the system can provide identification information associated with the client to an outside system (e.g., an authorization system) which can determine whether the identified client is authorized to provide search requests. Upon receipt of information indicating the identified client can provide search requests, the system can perform the search request.

The system performs a cryptographic process on the received search criteria (block 506). The system generates, for example, keyed-hash message authentication codes (HMACs) from the search criteria. As described above, the HMACs can be provided to the search system for utilization in identifying corresponding search results.

The system provides the processed search criteria, and the sort criteria, to the search system. The system provides, for example, HMACs of the search criteria, and the sort criteria (e.g., plaintext sort criteria). The search system can then determine search results sorted according to the sort criteria block 508), and the system can receive unique identifiers associated with the search results (block 510).

The system provides the unique identifiers to a data storage system (block 512). As described above, the data storage system can store information as being associated with unique identifiers. The system can provide the unique identifiers associated with the sorted search results, and the data storage can obtain the corresponding information. For example, in implementations in which the data storage system encrypts received information, the data storage system can decrypt the information associated with the provided search results. The system can then receive the decrypted information, and provide it to the client. In implementations in which the system encrypts information prior to providing the information for storage to the data storage system, the system can receive encrypted information associated with the unique identifiers. The system can then decrypt the information, and provide the information to the client.

As described above, a threshold number of search results may be provided to the client. For example, subsequent to sorting the search results, the system can provide a top threshold of the search results to the client. The threshold can be specified by the client, and for example can be based on a number of search results that are to be presented to a user of the client. As an example, the client can present a user interface to the user that enables search requests to be provided to the system. The user interface can then present a particular number of search results (e.g., based on a display size, a user-specified number, and so on). For example, the user interface can present paginated search results. If the user requests that a next threshold number of search results are to be presented (e.g., a second page), the system can ache the received unique identifiers of the search results and can quickly obtain the next threshold number of search results. For example, the system can provide the next threshold number of unique identifiers to the data storage system, and then provide the search results to the client.

Figure 6:
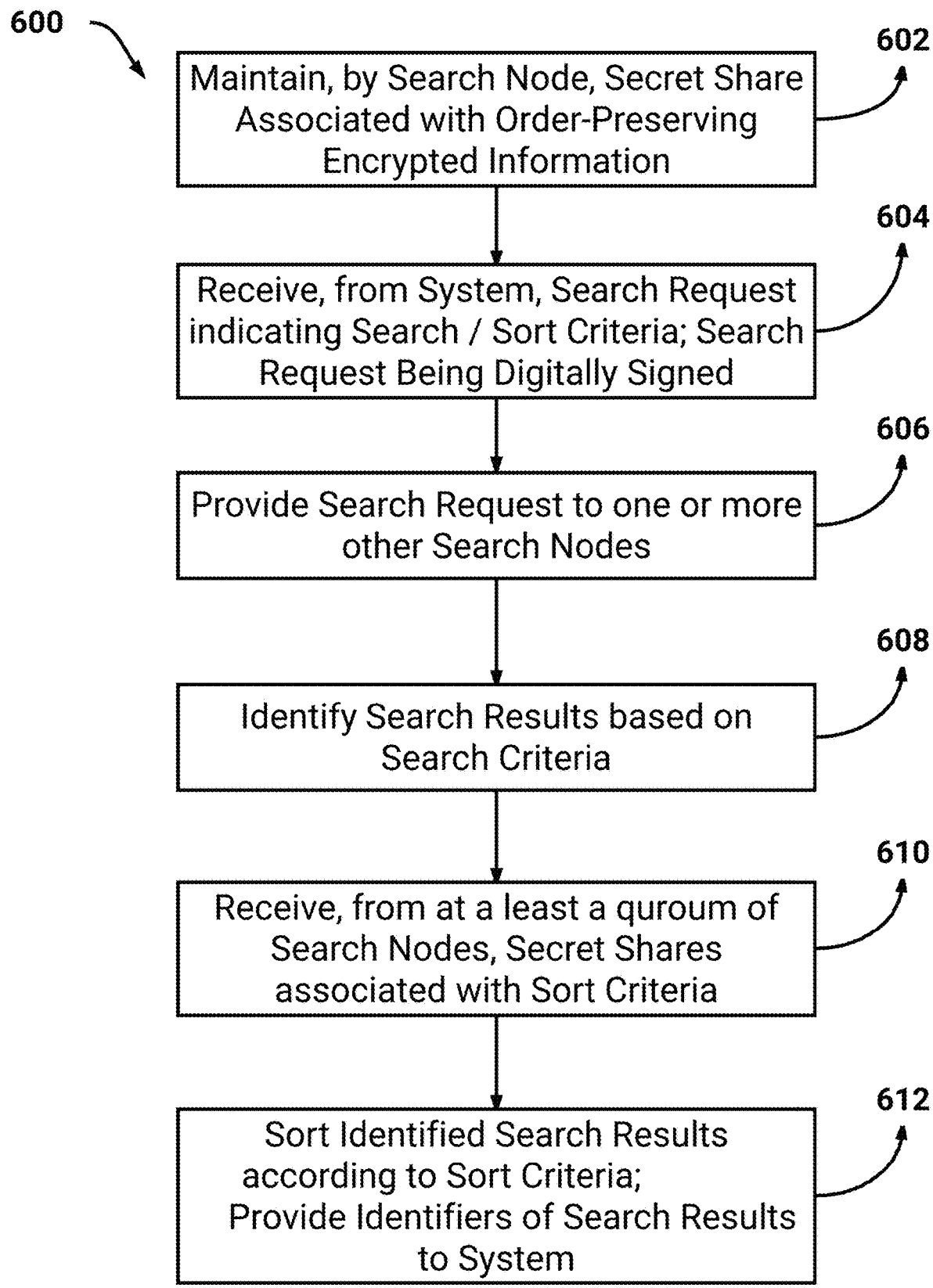
FIG. 6 is a flowchart of an example process for a search node to obtain sorted search results.

FIG. 6 is a flowchart of an example process 600 for a search node to obtain sorted search results. For convenience, the process 600 will be described as being performed by a system of one or more computers (e.g., index system node A 152A). Optionally, the process 600 can be performed by an agent associated with a search node (e.g., node sort engine A 154A executing on index system node A 152A).

The system maintains secret shares associated with order-preserving encrypted information (block 602). As described above, with respect to FIGS. 2A-2C, the system can receive secret shares generated by an outside system (e.g., the intermediate encryption retrieval system 100). Each secret share can be specific to a particular value received from a client, and upon a quorum of secret shares, an order-preserving encrypted ciphertext of the particular value can be generated. The system can optionally maintain the secret share information as one or more database tables. For example, the database tables can indicate unique identifiers associated with values, fields associated with the values, and secret shares generated for the values.

The system receives a search request indicating search and sort criteria (block 604), with the search criteria being cryptographically processed. As described above, the system can ensure that the search request is received from the outside system (e.g., the intermediate encryption retrieval system 100), for example the search request can be digitally signed (e.g, according to a public key infrastructure system). The system can provide the search request to remaining search nodes (block 606), and can wait until a quorum of search nodes is established. Similarly, the remaining search nodes can ensure that the search request is from the outside system, for example based on the digital signature associated with the search request. Upon the quorum being established, the system can optionally provide information to non-quorum search nodes to ignore the search request. Each of the quorum search nodes can then identify search results based on the received search request.

The system identifies search results based on the search criteria (block 608). As described above in FIG. 2C, the agent can remove the sort criteria and provide the search criteria to its associated search node. Based on the search criteria, the system can identify unique identifiers associated with indexed information. The system receives secret shares associated with the identified search results from the quorum of search nodes (block 610). As described above, with respect to FIG. 2C, each of the quorum of search nodes can obtain search results, and based on the search results, can obtain secret shares for values included in the search results. Utilizing the sort criteria, the quorum of search nodes (e.g., respective agent associated with the search nodes) can obtain secret shares specific to values relevant to the sort criteria. For example, if the sort criteria indicates that a particular field is to be sorted, the secret shares can be specific to values associated with the particular field.

The system sorts the identified search results according to the sort criteria (block 612). Based on the received secret shares, the system can generate order-preserved encrypted ciphertext associated with values in the identified search results. The system can then perform a sorting process based on comparisons of the order-preserved encrypted ciphertexts. The sorting process can cause the ciphertexts to be sorted according to the sort criteria, and the system can obtain sorted search results. Unique identifiers associated with the sorted search results are then provided to the outside system (e.g., the intermediate encryption retrieval system 100).

Figure 7:
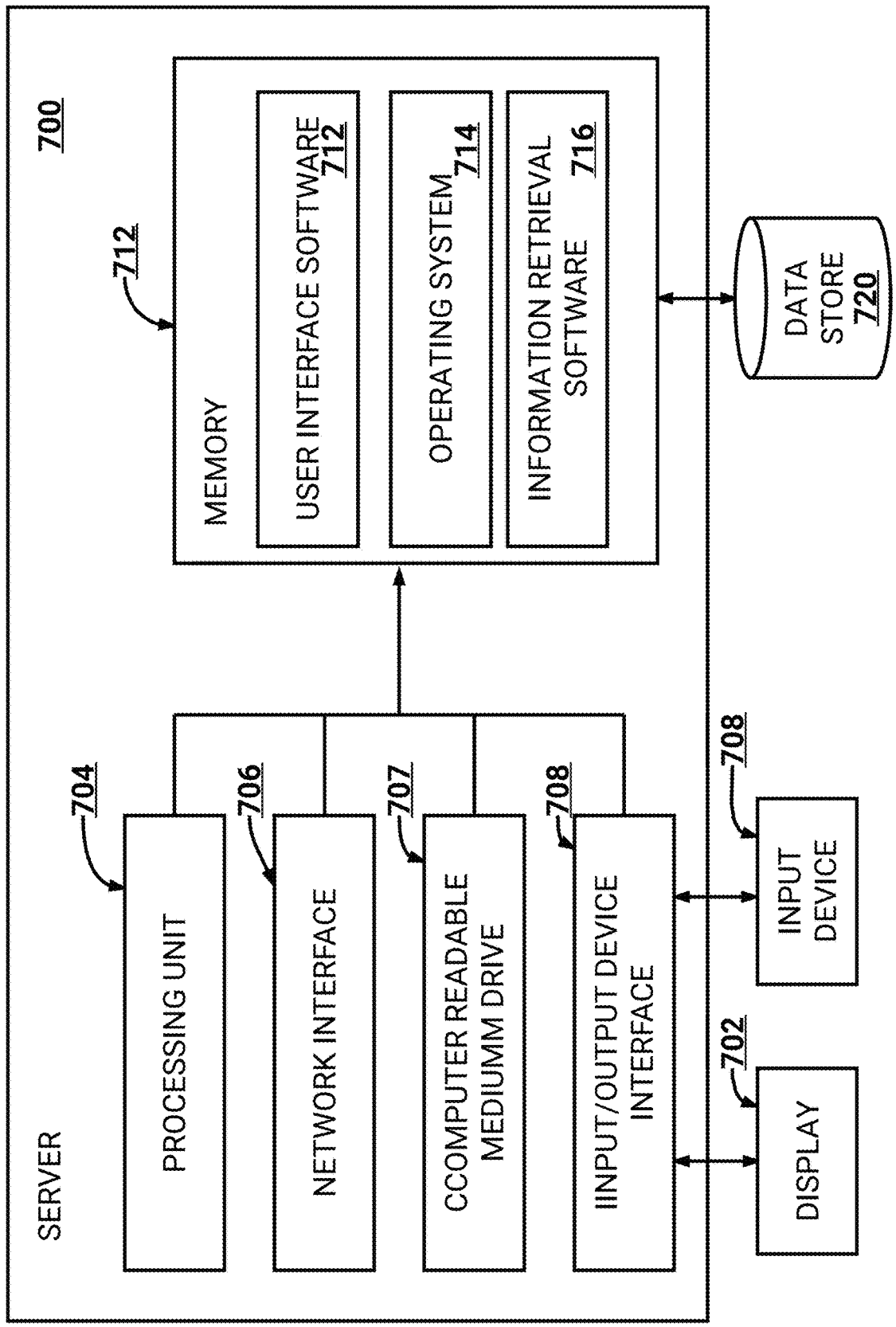
FIG. 7 is a block diagram depicting an illustrative configuration of one embodiment of a server than may implement elements of the intermediate encryption retrieval system of FIG. 1.

FIG. 7 depicts one embodiment of an architecture of a server 700 that may implement one or more of the elements of the intermediate encryption retrieval system 100. The general architecture of server 700 depicted in FIG. 7 includes an arrangement of computer hardware and software components that may be used to implement aspects of the present disclosure. As illustrated, the server 700 includes a processing unit 704, a network interface 706, a computer readable medium drive 707, an input/output device interface 720, a display 702, and an input device 724, all of which may communicate with one another by way of a communication bus. The network interface 706 may provide connectivity to one or more networks or computing systems, such as to one or more clients, indexing systems (e.g., insecure index system 150), data storage systems (e.g., secure data storage system 130), and so on. The processing unit 704 may thus receive information and instructions from other computing systems or services via a network. The processing unit 704 may also communicate to and from memory 710 and further provide output information for an optional display 702 via the input/output device interface 720. The input/output device interface 720 may also accept input from the optional input device 724, such as a keyboard, mouse, digital pen, etc. In some embodiments, the server 700 may include more (or fewer) components than those shown in FIG. 7. For example, some embodiments of the server 700 may omit the display 702 and input device 724, while providing input/output capabilities through one or more alternative communication channel (e.g., via the network interface 706).

The memory 710 may include computer program instructions that the processing unit 704 executes in order to implement one or more embodiments. The memory 710 generally includes RAM, ROM, and/or other persistent or non-transitory memory. The memory 710 may store an operating system 714 that provides computer program instructions for use by the processing unit 704 in the general administration and operation of the server 700. The memory 710 may further include computer program instructions and other information for implementing aspects of the present disclosure. For example, in one embodiment, the memory 710 includes user interface software 712 that generates user interfaces (and/or instructions therefor) for display upon a computing device, e.g., via a navigation interface such as a web browser installed on the computing device. In addition, memory 710 may include or communicate with one or more auxiliary data stores, such as data store 720, which may correspond to any persistent or substantially persistent data storage, such as a hard drive (HDD), a solid state drive (SDD), network attached storage (NAS), a tape drive, or any combination thereof.

In addition to the user interface module 712, the memory 710 may include information retrieval software 716 that may be executed by the processing unit 704. In one embodiment, the information retrieval software 716 implements various aspects of the present disclosure, e.g., securely storing information in an insecure indexing system and/or data storage system, and enabling search requests from clients to be performed on the stored information. While the information retrieval software 716 is shown in FIG. 7 as part of the server 700, in other embodiments, all or a portion of the software may be implemented by alternative computing devices, such as virtual computing devices within a hosted computing environment.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system comprising:
   a first data store containing a plurality of items, each item corresponding to at least a first field and a second field, and representing values for each of the first and second fields;
   a second data store containing an index of the plurality of items, wherein each item of the plurality of items is indexed within the index according to at least a cryptographic hash of the value of the first field represented by the item;
   a plurality of secret sharing computing devices storing encrypted versions of the values of the second field represented by the plurality of items, the encrypted versions encrypted according to an order-preserving encryption algorithm, wherein each encrypted version is split according to a secret sharing algorithm into a plurality of shares stored among multiple secret sharing computing devices of the plurality of secret sharing computing devices; and
   a computing device configured to:
      receive a search request specifying search criteria comprising a set of desired cryptographic hash values and sort criteria identifying the second field;
      determine, from at least the index, one or more items, from the plurality of items, that satisfy the search criteria;
      retrieve, from one or more of the plurality of secret sharing computing devices, encrypted versions of the values of the second field represented by the one or more items;
      sort the one or more items according to the encrypted versions of the values of the second field represented by the one or more items; and
      return, in response to the search request, information identifying the one or more items and a sorting of the one or more items according to the encrypted versions of the values of the second field.

2. The system of claim 1, wherein the search request is received from an intermediate system in communication with a requesting client, and wherein the intermediate system generates the cryptographic hash values based on search criteria received from the requesting client.

3. The system of claim 1, wherein the computing device comprises a particular secret sharing computing device, and wherein the particular secret sharing computing device provides the search criteria and sort criteria to remaining secret sharing computing devices.

4. The system of claim 3, wherein the particular index system node is selected, by the indexing system, based on a load balancing process.

5. The system of claim 3, wherein the particular secret sharing computing device receives responses from one or more remaining secret sharing computing devices, such that a quorum of secret sharing computing devices is formed, and wherein secret sharing computing devices outside of the quorum discard the search criteria and sort criteria.

6. The system of claim 5, wherein the quorum of secret sharing computing devices each determine items that satisfy the search criteria, and wherein the responsive secret sharing computing devices provide, to the particular secret sharing computing device, shares of encrypted versions of the values of the second field, such that the particular secret sharing computing device generates encrypted versions of the values.

7. A method implemented by a system of one or more computers, wherein the method comprises:
   maintaining, by the system, indexing information associated with items of information received from an information retrieval system, each item of information including a plurality of fields and values associated with the plurality of fields,
   wherein indexing information includes, for each value, a cryptographic hash of the value and a plurality of secret shares of an order-preserved encrypted (OPE) value of the value, such that a quorum of secret shares are required to generate the OPE value;
   receiving a search request indicating search criteria and sort criteria, wherein the search criteria is received as cryptographic hashes;
   identifying, based on the index information, search results corresponding to the search criteria, and sorting the search results based on an obtained quorum of secret shares for each value, associated with the sort criteria, that is included in the search results; and
   providing, in response to the search request, information indicating sorted search results.

8. The method of claim 7, wherein the system comprises a plurality nodes, each node maintaining indexing information, wherein for each value included in an item of information, the plurality of nodes maintains a respective secret share of an associated OPE value.

9. The method of claim 8, wherein upon receipt of the search request, a particular node is selected to process the search request, and wherein the method further comprises:
  providing, by the particular node, the search criteria and sort criteria to remaining nodes;
  identifying, by the particular node, search results based on the search criteria, the search results indicating items of information, wherein one or more other nodes forming a quorum of nodes identify search results based on the search criteria;
  obtaining, by the particular node, secret shares of OPE values of particular values included in the search results, wherein the one or more other nodes provide respective secret shares of OPE values of the particular values; and
  sorting the search results, by the particular values, based on the quorum of secret shares of associated OPE values.

10. The method of claim 9, wherein the particular values are associated with a field indicated in the sort criteria.

11. The method of claim 7, wherein the sort criteria indicates a particular field, and wherein the quorum of secret shares are associated with values of the particular field.

12. The method of claim 7, wherein the items of information are received as plaintext by the information retrieval system, and wherein the information retrieval system provides the items of information to the system with each plaintext value replaced with (1) a cryptographic hash, and (2) a plurality of secret shares associated with an OPE value.

13. Non-transitory computer storage media storing instructions that when executed by a system of one or more computers, cause the system to perform operations, the system being in communication with one or more clients and one or more search engines, wherein the operations comprise:
  obtaining, from a client, a request associated with storage of client information in a search engine of the one or more search engines;
  generating first cryptographic information based on the client information, the first cryptographic information being cryptographically processed from a portion of the client information, wherein the first cryptographic information is to be utilized by the search engine for indexing;
  generating second cryptographic information comprising performing an order-preserving encryption process on the portion of the client information, wherein the second cryptographic information is to be utilized by the search engine to recover an order associated with information included in the portion; and
  providing, for storage in the search engine, the first cryptographic information and the second cryptographic information.

14. The non-transitory computer storage media of claim 13, wherein the client information includes one or more values associated with respective fields, wherein the client information is associated with a unique identifier,
  and wherein generating the first cryptographic information comprises:
    obtaining, from an outside system maintaining cryptographic keys, a cryptographic key;
    determining, based at least in part on the cryptographic key, cryptographic hashes associated with the included values; and
    generating the first cryptographic information as replacing the values included in the client information with respective cryptographic hashes, the first cryptographic information being associated with the unique identifier.

15. The non-transitory computer storage media of claim 13, wherein the client information includes one or more values associated with respective fields, wherein the client information is associated with a unique identifier,
  and wherein generating the second cryptographic information comprises:
    obtaining, from an outside system maintaining cryptographic keys, a cryptographic key;
    determining order-preserved ciphertext, for each of the included values, via performance of an order-preserving encryption process based, at least in part, on the cryptographic key; and
    generating the second cryptographic information as replacing the values included in the client information with respective order-preserved ciphertexts, the second cryptographic information being associated with the unique identifier.

16. The non-transitory computer storage media of claim 15, wherein the search engine comprises a plurality of search nodes, the plurality of search nodes search nodes comprising a system of one or more computers, and wherein the operations further comprise:
  obtaining information indicating a number of the search nodes, and information specifying a quorum of the search nodes;
  for each determined order-preserved ciphertext, determining a plurality of secret shares of the order-preserved ciphertext according to the number of the search nodes; and
  providing, for storage by each search node, respective secret shares of the plurality of order-preserved ciphertexts, such that to recover an order-preserved ciphertext, secret shares associated with at least the quorum of search nodes are required.

17. The non-transitory computer storage media of claim 13, wherein the client information includes one or more values associated with respective fields, wherein the client information is associated with a unique identifier, and wherein the operations further comprise:
  providing the client information for storage in a data storage system, the client information being identifiable via the unique identifier.

18. The non-transitory computer storage media of claim 17, wherein providing the client information for storage comprises:
  obtaining, from an outside system maintaining cryptographic keys, a cryptographic key;
  encrypting the client information based on the obtained cryptographic key, and providing the encrypted client information to the data storage system, the encrypted client information being identifiable via the unique identifier.

19. The non-transitory computer storage media of claim 17, wherein the operations further comprise:
  obtaining, from a second client, a second request associated with searching of information, the second request indicating search criteria and sort criteria;
  generating search cryptographic information based on the search criteria, the search cryptographic information being cryptographically processed from the search criteria, and the search cryptographic information being utilized by the search engine for identifying corresponding search results;

providing, to the search engine, the search cryptographic information and the sort criteria, the sort criteria being utilized by the search engine to determine an order associated with identified search results; and receiving, from the search engine, one or more unique identifiers associated with identified search results.

20. The non-transitory computer storage media of claim 18, wherein the operations further comprise:

providing, to the data storage system, the one or more unique identifiers;

receiving, from the data storage system, client information associated with the unique identifiers; and providing, to the second client, the received client information.

* * * * *

UNITED STATES PATENT AND TRADEMARK OFFICE
CERTIFICATE OF CORRECTION

Page 1 of 2

PATENT NO. : 10,541,983 B1
APPLICATION NO. : 15/654468
DATED : January 21, 2020
INVENTOR(S) : Khashei Varnamkhasti et al.

It is certified that error appears in the above-identified patent and that said Letters Patent is hereby corrected as shown below:

On the Title Page

Item (57) Abstract, Line 8, change "cryptographic" to --cryptographic information--.

In the Drawings

On Sheet 5 of 10, (Reference Numeral 262) (FIG. 2C), Line 4, change "Quroum" to --Quorum--.

On Sheet 6 of 10, (Reference Numeral 304) (FIG. 3), Line 2, change "authoriation" to --authorization--.

On Sheet 8 of 10, (Reference Numeral 504) (FIG. 5), Line 2, change "authoriation" to --authorization--.

On Sheet 9 of 10, (Reference Numeral 610) (FIG. 6), Line 1, change "quroum" to --quorum--.

On Sheet 10 of 10, (Reference Numeral 707) (FIG. 7), Line 1, change "CCOMPUTER" to --COMPUTER--.

On Sheet 10 of 10, (Reference Numeral 707) (FIG. 7), Line 2, change "MEDIUMM" to --MEDIUM--.

On Sheet 10 of 10, (Reference Numeral 708) (FIG. 7), Line 1, change "IINPUT" to --INPUT--.

In the Specification

In Column 6, Line 56, change "'off'-the-shelf" to --'off-the-shelf'--.

In Column 14, Line 64, change "100." to --100--.

Signed and Sealed this
Twenty-third Day of June, 2020

Andrei Iancu
*Director of the United States Patent and Trademark Office*

CERTIFICATE OF CORRECTION (continued)
U.S. Pat. No. 10,541,983 B1

In the Claims

In Column 26, Line 24, in Claim 16, change "search nodes search nodes" to --search nodes--.